United States Patent
Guo et al.

(10) Patent No.: US 7,965,783 B2
(45) Date of Patent: Jun. 21, 2011

(54) METHOD AND SYSTEM FOR TRANSMITTING DATA STREAMS VIA A BEAMFORMED MIMO CHANNEL

(75) Inventors: Li Guo, Irving, TX (US); Hang Jin, Plano, TX (US)

(73) Assignee: Cisco Technology, Inc., San Jose, CA (US)

(*) Notice: Subject to any disclaimer, the term of this patent is extended or adjusted under 35 U.S.C. 154(b) by 639 days.

(21) Appl. No.: 11/957,433

(22) Filed: Dec. 15, 2007

(65) Prior Publication Data

US 2008/0165877 A1 Jul. 10, 2008

Related U.S. Application Data

(60) Provisional application No. 60/879,200, filed on Jan. 8, 2007.

(51) Int. Cl.
*H04L 23/02* (2006.01)
(52) U.S. Cl. ........................................ 375/265
(58) Field of Classification Search ............ 375/260, 375/262, 265, 267, 295, 299, 341, 347; 370/334, 370/350; 455/101
See application file for complete search history.

(56) References Cited

U.S. PATENT DOCUMENTS

| | | | |
|---|---|---|---|
| 6,975,666 B2 | 12/2005 | Affes et al. | |
| 7,072,413 B2 | 7/2006 | Walton et al. | |
| 7,676,007 B1 * | 3/2010 | Choi et al. | 375/347 |
| 2006/0039493 A1 | 2/2006 | Mukkavilli et al. | |
| 2007/0165738 A1 * | 7/2007 | Barriac et al. | 375/267 |
| 2007/0280340 A1 * | 12/2007 | Hwang et al. | 375/222 |
| 2007/0297529 A1 * | 12/2007 | Zhou et al. | 375/267 |
| 2008/0013644 A1 * | 1/2008 | Hugl et al. | 375/295 |
| 2009/0122884 A1 * | 5/2009 | Vook et al. | 375/260 |
| 2009/0296650 A1 * | 12/2009 | Venturino et al. | 370/330 |

OTHER PUBLICATIONS

International Search Report and Written Opinion dated Oct. 3, 2008 cited in PCT/US07/88755.

* cited by examiner

*Primary Examiner* — Khanh C Tran

(57) ABSTRACT

A method and apparatus are provided for transmitting data streams in a wireless multiple-input-multiple-output (MIMO) communications system. The method comprises receiving a plurality of signals by a first mobile station, the plurality of signals being transmitted from antennas on a second mobile station, computing a plurality of beamforming weighting vectors from the received plurality of signals, calculating a pre-coding parameter matrix for a beamformed MIMO channel between the first and second mobile stations using the plurality of beamforming weighting vectors and the plurality of signals, determining a normalized transmitting power distribution for data streams transmitted via the beamformed MIMO channel, allocating transmitting power to the beamformed MIMO channel, wherein the data streams are transmitted via the beamformed MIMO channel having an optimized transmitting power distribution.

20 Claims, 3 Drawing Sheets

METHOD AND SYSTEM FOR TRANSMITTING DATA STREAMS VIA A BEAMFORMED MIMO CHANNEL

CROSS REFERENCE

The present application claims the benefit of U.S. Provisional Application Ser. No. 60/879,200, which was filed on Jan. 8, 2007.

BACKGROUND

A multiple-input-multiple-output (MIMO) wireless communications system comprises at least one base transceiver station (BTS) with multiple antennas and multiple mobile stations (MS), of which at least one has multiple antennas. The utilization of a beamforming technique can enhance the performance of a MIMO wireless communications system.

An L-by-N beamformed MIMO channel can be created between a BTS with M antennas and an MS with N antennas, where $L \leq \min(M, N)$. The BTS computes a set of L beamforming weighting vectors by using the channel information obtained from the signals sent by the MS and the feedback on the beamformed channels from the MS. The quality of the beamforming weighting vectors is crucial to the performance of the beamformed channels.

There are a number of methods available for a BTS to compute beamforming weighting vectors by utilizing signals transmitted from antennas on the MS. One such method is to acquire the primary eigenvector of a covariance eigenvalue problem that describes the communications channel. Using this method, signals sent from a target antenna are regarded as desired signals while those sent from non-target antennas are regarded as interference signals.

Conventional methods for creating a beamformed MIMO channel assume that the channel characteristics of all signal paths are deemed the same. As a result, the transmitting signals are directly sent via the corresponding signal paths, and the transmitting power allocated to all signal paths in the beamformed MIMO channel is set to the same value. However, in reality, the channel characteristics of all signal paths of the beamformed MIMO channel are not the same. Hence, equal transmitting power among all signal paths in a beamformed MIMO channel does not ensure that they all achieve the optimal performance.

In order to achieve optimal performance, the data streams transmitted via the corresponding signal paths in a beamformed MIMO channel are adjusted according to the modulation and coding rate, and the transmitting power is adapted to the channel characteristic of the signal paths.

SUMMARY

A method and apparatus are provided for transmitting data streams in a wireless multiple-input-multiple-output (MIMO) communications system. The method comprises receiving a plurality of signals by a first mobile station, the plurality of signals being transmitted from antennas on a second mobile station, computing a plurality of beamforming weighting vectors from the received plurality of signals, calculating a pre-coding parameter matrix for a beamformed MIMO channel between the first and second mobile stations using the plurality of beamforming weighting vectors and the plurality of signals, determining a normalized transmitting power distribution for data streams transmitted via the beamformed MIMO channel, allocating transmitting power to the beamformed MIMO channel, wherein the data streams are transmitted via the beamformed MIMO channel having an optimized transmitting power distribution.

The construction and method of operation of the invention, together with additional objects and advantages thereof, is best understood from the following description of specific embodiments when read in connection with the accompanying drawings.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale

DESCRIPTION OF EXAMPLE EMBODIMENTS

The following detailed description of the invention refers to the accompanying drawings. The description includes exemplary embodiments, not excluding other embodiments, and changes may be made to the embodiments described herein without departing from the spirit and scope of the invention. The following detailed description does not limit the invention. Instead, the scope of the invention is defined by the appended claims.

The present invention discloses a method for transmitting data streams via a beamformed multiple-input-multiple-output (MIMO) channel having an optimized transmitting power distribution in a wireless (MIMO) communications system. A base transceiver station (BTS) in one such system computes a set of beamforming weighting vectors for an MS. Specifically, a beamforming weighting vector for a target antenna on the MS is computed by partially nulling out undesired signals transmitted from non-target antennas. The set of beamforming weighting vectors dynamically creates a beamformed MIMO channel, which results in de-correlating the signals transmitted via beamformed MIMO channel. Subsequently, a set of pre-coding parameters is determined by the signals transmitted from the MS and the set of beamforming weighting vectors.

According to the set of pre-coding parameters, data streams are mapped to the corresponding signal paths in a beamformed MIMO channel. Since the link condition of a beamformed MIMO channel change constantly in a real environment, how the transmitting power is distributed among the signal paths in a beamformed MIMO channel depends on the modulation and coding rate of the data streams. The data streams are transmitted with appropriate weights via the beamformed MIMO channel after pre-coding parameters and optimized transmitting distribution are applied to them. As a result, the beamformed MIMO channel provide maximum throughput and improve the performance of the wireless communications network.

Figure 1:
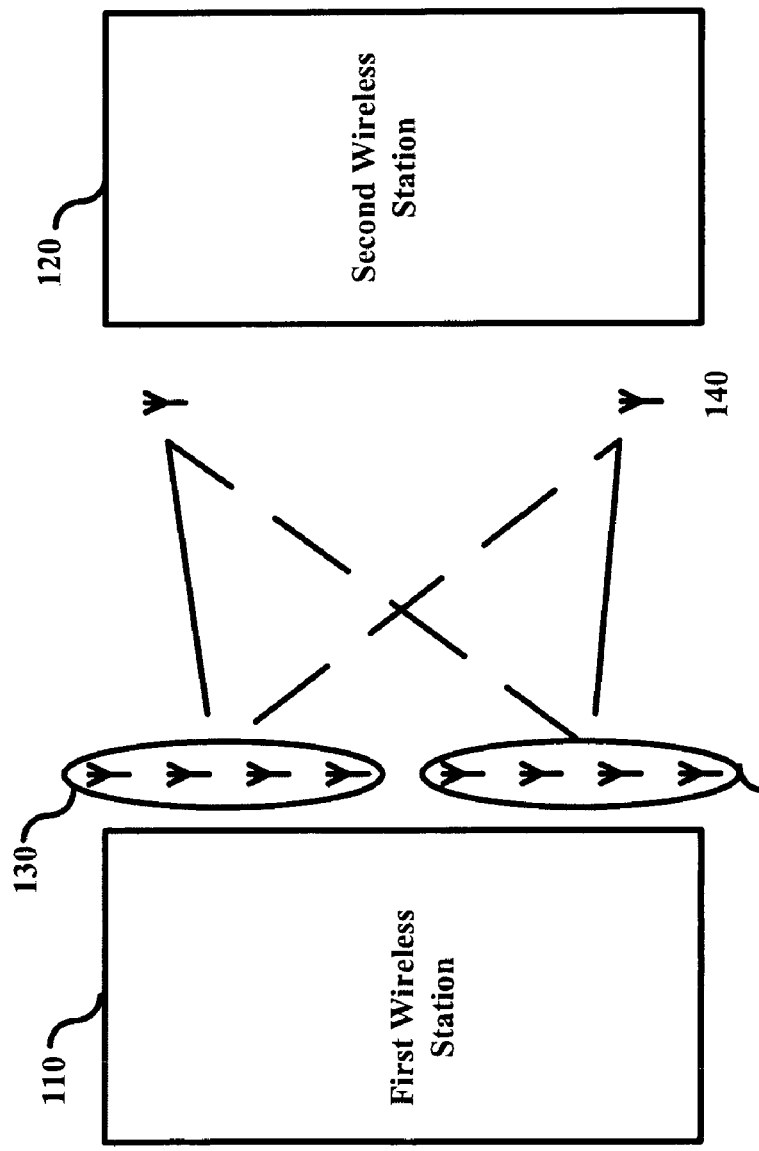
FIG. 1 illustrates a typical M×N MIMO network comprising two or more mobile stations.

FIG. 1 illustrates a typical M×N MIMO network comprising two or more mobile stations. The first mobile station 110 has M antennas 130, and the second mobile station 120 has N antennas 140. Applying the beamforming weighting vectors to the M antennas 130 results in a beamformed MIMO channel. A beamformed channel from the first to the second mobile station is different from one from the second to the first mobile station. FIG. 1 shows a 2-by-2 beamformed MIMO channel from the first mobile station 110 to the second mobile station 120.

Figure 2:
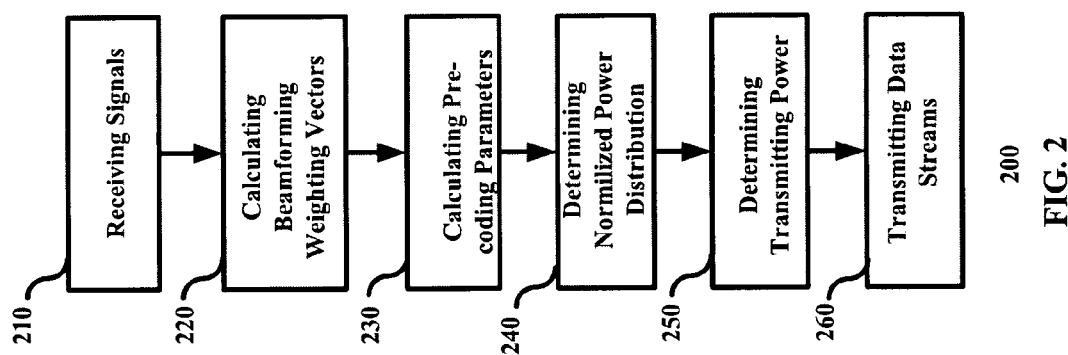
FIG. 2 illustrates a method for creating a beamformed MIMO channel having a transmitting power distribution in accordance with one embodiment of the present invention.

FIG. 2 illustrates a method for transmitting data streams via beamformed MIMO channels having an optimized transmitting power distribution in a wireless communications system. The MIMO network shown in FIG. 2 is identical to the one shown in FIG. 1. The following exemplary embodiment describes a 4×2 MIMO wireless communications network, however, the disclosed invention is applicable to wireless communications systems of other configurations.

The method starts with step 210 in which four antennas on a BTS receive signals transmitted from an antenna i on an MS, where i=1,2. A vector of signals which are transmitted from the antenna i on the MS and received by the four antennas on the BTS is denoted as $S_i$, where $S_i=(S_{i1},S_{i2},\ldots,S_{i3},S_{i4})$. The $S_{ij}$ represents a signal which is transmitted from the antenna i on the MS and received by an antenna j on the BTS, where j=1 . . . 4.

In step 220, the BTS calculates a beamforming weighting vector for each antenna on the MS with all $S_i$, where i=1,2. A beamforming weighting vector for an antenna t on the MS, where t=1,2, is represented by $W_t=(W_{t1},W_{t2},W_{t3},W_{t4})$, where Norm($W_t$)=1. One with skills in the art would recognize that the Norm(.) represents a vector norm. When the BTS computes a beamforming weighting vector $W_t$ for the antenna t, signals transmitted from the antenna t on the MS to the BTS are regarded as desired signals. By contrast, signals transmitted from one or more remaining antennas on the MS to the BTS are regarded as interference signals.

The beamforming weighting vector $W_t$ for the antenna t on the MS is the primary eigenvector of the following matrix: $(\alpha_t^* R_i + \sigma_n^2 * I)^{-1} R_s * W_t = \lambda * W_t$ (1), where $R_i$ is a covariance matrix calculated from interference signals; $\sigma_n$ is the standard deviation of channel noise; $R_s$ is a covariance matrix calculated from desired signals; I is the identity matrix; $\lambda$ is the maximum eigenvalue; and $\alpha_t$ is a scaling factor for nulling out interference signals, where $\alpha_t<1$. The scaling factor $\alpha_t$ represents the degree of nulling of interference signals and it can be changed dynamically according to operating conditions. The larger $\alpha_t$ is, the less correlated the signals in the beamformed MIMO channel are. In addition, the larger $\alpha_t$ is, the smaller the beamformed gain is.

In step 230, a set of pre-coding parameters is calculated by using the receiving signals $S_t$ and the beamfroming weighting vectors $W_t$, where t=(1,2). More specifically, the set of pre-coding parameters is calculated, using the singular value decomposition (SVD) method, according to the following equation:

$$\begin{bmatrix} W_1^* \cdot S_1 & W_2^* \cdot S_1 \\ W_1^* \cdot S_2 & W_2^* \cdot S_2 \end{bmatrix} = U\Sigma V^T = U \begin{bmatrix} d_1 & 0 \\ 0 & d_2 \end{bmatrix} \begin{bmatrix} V_{11} & V_{12} \\ V_{21} & V_{22} \end{bmatrix}^T,$$

where $W_t^*$ is the conjugate transpose of $$W_t; \begin{bmatrix} V_{11} & V_{12} \\ V_{21} & V_{22} \end{bmatrix}$$

defines a pre-coding parameter matrix G; and $d_1$ and $d_2$ represent a set of transmitting power distribution factors.

In step 240, the modulation and coding rate of data streams $X_1$ and $X_2$, transmitted via different signal paths in the beamformed MIMO channel, are determined in accordance with a predetermined system function. Subsequently, the modulation and coding rate determine normalized transmitting power distribution. $A_1$ and $A_2$ represent normalized transmitting power distribution for data streams $X_1$ and $X_2$, respectively.

In step 250, the allocation of transmitting power to each signal path in beamformed MIMO channel is calculated with the following equation:

$$\frac{d_1^2 P_1}{d_2^2 P_2} = \frac{A_1}{A_2},$$

where $d_1$ and $d_2$ are transmitting power distribution factors obtained from the SVD; $P_1$ and $P_2$ represent transmitting power of signal path 1 and 2 in the beamformed MIMO channel, respectively; and $A_1$ and $A_2$ represent normalized transmitting power distribution for signal path 1 and 2 in the beamformed MIMO channel, respectively.

In step 260, the data streams $X_1$ and $X_2$ are weighted based on the pre-coding parameter matrix G before they are transmitted to the MS via the beamformed MIMO channel. The signals are transmitted via the beamformed MIMO channel with the transmitting power $P_1$ and $P_2$ calculated in step 250.

Figure 3:
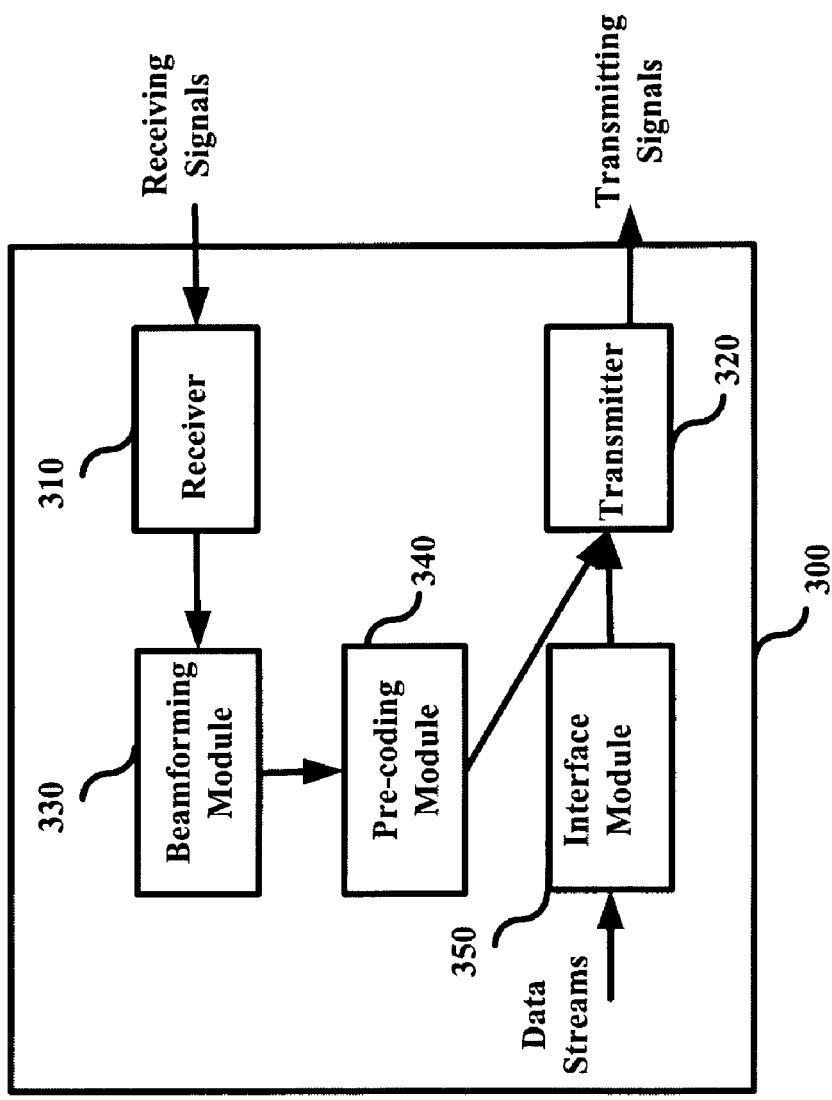
FIG. 3 is a block diagram depicting a wireless base transceiver station in accordance with the embodiment of the present invention.

FIG. 3 is a diagram depicting a wireless base transceiver station (BTS) in accordance with the present invention. A BTS 300 comprises a receiver 310, a transmitter 320, a beamforming module 330, a pre-coding module 340, and an interface module 350 for receiving data streams. The receiver 310 receives and decodes receiving signals transmitted from an MS. The channel information retrieved from the receiving signals and the feedback on the beamformed MIMO channel obtained from the decoded messages are forwarded to the beamforming module 330. The beamforming module 330 computes the beamforming weighting vectors to create beamformed MIMO channel. Subsequently, the beamforming weighting vectors and the receiving signals are forwarded to the pre-coding module 340, which calculates a pre-coding parameter matrix G and transmitting power distribution factors $d_1$ and $d_2$.

The interface 350 receives data streams $X_1$ and $X_2$ from users. The modulation and coding rate of the data streams $X_1$ and $X_2$ are determined in accordance with a predetermined system function. Subsequently, the modulation and coding rate determines normalized transmitting power distribution $A_1$ and $A_2$ for signal paths 1 and 2 in the beamformed MIMO channel, respectively. Finally, the transmitter 320 weighs the data streams $X_1$ and $X_2$ based on the pre-coding parameter matrix G and calculates the transmitting power $P_1$ and $P_2$ for the signal path 1 and 2 in the beamformed MIMO channel, respectively.

The above illustration provides many different embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
   receiving a plurality of signals at a plurality of antennas of a first wireless station, the plurality of signals being transmitted from antennas on a second wireless station;
   computing a plurality of beamforming weighting vectors from the received plurality of signals;
   calculating a pre-coding parameter matrix for a beamformed multiple-input multiple-output (MIMO) channel between the first wireless station and the second wireless station from the plurality of beamforming weighting vectors and the plurality of signals received at the first wireless station;
   determining a normalized transmitting power distribution for the beamformed MIMO channel; and
   applying weights based on the pre-coding parameter matrix to data streams to be transmitted from the plurality of antennas of the first wireless station to the second wireless station and allocating transmitting power to the beamformed MIMO channel for the data streams according to the normalized transmitting power distribution.

2. The method of claim 1, wherein computing comprises computing a beamforming weighting vector for each target antenna on the second wireless station.

3. The method of claim 2, wherein computing comprises computing the beamforming weighting vector for a target antenna by nulling out signals received from non-target antennas of the second wireless station, wherein signals received from target antennas of the second wireless station are regarded by the first wireless station as desired signals and signals received from non-target antennas of the second wireless station are regarded as interference signals by the first wireless station.

4. The method of claim 3, wherein computing comprises computing the beamforming weighting vector for a target antenna as a primary eigenvector of the matrix: $(\alpha_t^* R_i + \sigma_n^2 * I)^{-1} R_s * W_t = \lambda * W_t$, where $R_i$ is a covariance matrix calculated from the interference signals; $\sigma_n$ is the standard deviation of channel noise; $R_s$ is a covariance matrix calculated from the desired signals; I is the identity matrix; $\lambda$ is the maximum eigenvalue; $W_t$ is the beamforming weighting vector for the antenna t; and $\alpha_t$ is a scaling factor for nulling out the interference signals, where $\alpha_t < 1$.

5. The method of claim 4, wherein the scaling factor $\alpha_t$ defines a degree of nulling of the interference signals.

6. The method of claim 1, and further comprising computing the pre-coding parameter matrix using a singular value decomposition (SVD) method, according to the equation:

$$\begin{bmatrix} W_1^* \cdot S_1 & W_2^* \cdot S_1 \\ W_1^* \cdot S_2 & W_2^* \cdot S_2 \end{bmatrix} = U \Sigma V^T = U \begin{bmatrix} d_1 & 0 \\ 0 & d_2 \end{bmatrix} \begin{bmatrix} V_{11} & V_{12} \\ V_{21} & V_{22} \end{bmatrix}^T,$$

where $W_t^*$ is the conjugate transpose of $$W_t; \begin{bmatrix} V_{11} & V_{12} \\ V_{21} & V_{22} \end{bmatrix}$$

defines the pre-coding parameter matrix G; and $d_1$ and $d_2$ represent transmitting power distribution factors; and $W_t$ is the beamforming weighting vector for the antenna t.

7. The method of claim 1, and further comprising determining the normalized transmitting power distribution for the data streams based on modulation and coding rate of the data streams.

8. The method of claim 7, and further comprising determining the modulation and coding rate of the data streams by a predetermined system function.

9. The method of claim 1, and further comprising computing the transmitting power according to the equation:

$$\frac{d_1^2 P_1}{d_2^2 P_2} = \frac{A_1}{A_2},$$

where $d_1$ and $d_2$ are transmitting power distribution factors; $P_1$ and $P_2$ represent transmitting power of signal paths 1 and 2, respectively, in the beamformed MIMO channel; and $A_1$ and $A_2$ represent normalized transmitting power distribution for the signal paths 1 and 2 in the beamformed MIMO channel respectively.

10. The method of claim 1, wherein applying the weights based on the pre-coding parameter matrix causes the data streams to be mapped to corresponding signal paths in the beamformed MIMO channel from the first wireless station to the second wireless station.

11. An apparatus comprising:
    a receiver configured to receive signals detected at a plurality of antennas that are transmitted from a mobile station;
    a beamforming module configured to compute beamforming weighting vectors for a beamformed multiple-input multiple-output (MIMO) channel;
    a pre-coding module configured to compute a pre-coding parameter matrix for the beamformed MIMO channel and transmitting power distribution factors based on the beamforming weighting vectors and the received signals;
    an interface module configured to receive data streams to be transmitted and to determine a normalized transmitting power distribution for the beamformed MIMO channel; and
    a transmitter configured to apply weights to the data streams based on the pre-coding parameters matrix for transmission from the plurality of antennas to the mobile station and to allocate transmitting power to the beamformed MIMO channel for the data streams according to the normalized transmitting power distribution.

12. The apparatus of claim 11, wherein computing the beamforming weighting vectors comprises computing a beamforming weighting vector for each target antenna on the mobile station.

13. The apparatus of claim 12, wherein computing comprises computing the beamforming weighting vector for a target antenna by nulling out signals received from non-target antennas of the mobile station, wherein signals received from target antennas are regarded as desired signals signals received from non-target antennas are regarded as interference signals.

14. The apparatus of claim 13, wherein the beamforming module is configured to compute the beamforming weighting vector for a target antenna as a primary eigenvector of the matrix: $(\alpha_t^* R_i + \sigma_n^2 * I)^{-1} R_s * W_t = \lambda * W_t$, where $R_i$ is a covariance matrix calculated from the interference signals; $\sigma_n$ is the standard deviation of channel noise; $R_s$ is a covariance matrix calculated from the desired signals; I is the identity matrix; $\lambda$ is the maximum eigenvalue; $W_t$ is the beamforming weighting vector for the antenna t; and $\alpha_t$ is a scaling factor for nulling out the interference signals, where $\alpha_t<1$.

15. The apparatus of claim 14, wherein the scaling factor $\alpha_t$ defines a degree of nulling of the interference signals.

16. The apparatus of claim 11, wherein the pre-coding module is configured to compute the pre-coding parameter matrix using a singular value decomposition (SVD) method, according to the equation:

$$\begin{bmatrix} W_1^* \cdot S_1 & W_2^* \cdot S_1 \\ W_1^* \cdot S_2 & W_2^* \cdot S_2 \end{bmatrix} = U\Sigma V^T = U \begin{bmatrix} d_1 & 0 \\ 0 & d_2 \end{bmatrix} \begin{bmatrix} V_{11} & V_{12} \\ V_{21} & V_{22} \end{bmatrix}^T,$$

where $W_t^*$ is the conjugate transpose of $$W_t; \begin{bmatrix} V_{11} & V_{12} \\ V_{21} & V_{22} \end{bmatrix}$$

defines the pre-coding parameter matrix G; and $d_1$ and $d_2$ represent transmitting power distribution factors; and $W_t$ is the beamforming weighting vector for the antenna t.

17. The apparatus of claim 11, wherein the pre-coding module is configured to determine the normalized transmitting power distribution for the data streams based on modulation and coding rate of the data streams.

18. The apparatus of claim 17, wherein the modulation and coding rate of the data streams is determined based on a predetermined system function.

19. The apparatus of claim 11, wherein the interface module is configured to determine the transmitting power according to the equation:

$$\frac{d_1^2 P_1}{d_2^2 P_2} = \frac{A_1}{A_2},$$

where $d_1$ and $d_2$ are transmitting power distribution factors; $P_1$ and $P_2$ represent transmitting power of signal paths 1 and 2, respectively, in the beamformed MIMO channel; and $A_1$ and $A_2$ represent normalized transmitting power distribution for the signal paths 1 and 2 in the beamformed MIMO channel respectively.

20. The apparatus of claim 11, wherein the transmitter is configured to apply the weights based on the pre-coding parameter matrix to map the data streams to corresponding signal paths in the beamformed MIMO channel.

* * * * *